United States Patent
Katsumata et al.

(10) Patent No.: US 11,589,258 B2
(45) Date of Patent: Feb. 21, 2023

(54) COMMUNICATION CONNECTION DEVICE AND COMMUNICATION CONNECTION METHOD

(71) Applicant: NTT DOCOMO, INC., Tokyo (JP)

(72) Inventors: Yuki Katsumata, Tokyo (JP); Shigeru Iwashina, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/263,720

(22) PCT Filed: Aug. 8, 2018

(86) PCT No.: PCT/JP2018/029822
§ 371 (c)(1),
(2) Date: Jan. 27, 2021

(87) PCT Pub. No.: WO2020/031303
PCT Pub. Date: Feb. 13, 2020

(65) Prior Publication Data
US 2021/0377781 A1     Dec. 2, 2021

(51) Int. Cl.
H04W 28/02 (2009.01)
H04W 28/14 (2009.01)

(52) U.S. Cl.
CPC ....... *H04W 28/0268* (2013.01); *H04W 28/14* (2013.01)

(58) Field of Classification Search
CPC . H04W 28/0268; H04W 28/14; H04W 28/10; H04W 72/12
See application file for complete search history.

(56) References Cited

U.S. PATENT DOCUMENTS

| | | | |
|---|---|---|---|
| 2017/0164349 A1* | 6/2017 | Zhu | H04W 48/18 |
| 2018/0109973 A1* | 4/2018 | Krendzel | H04L 45/38 |
| 2019/0182752 A1* | 6/2019 | Lou | H04W 28/0268 |
| 2019/0238413 A1* | 8/2019 | Holmström | H04L 41/0836 |
| 2019/0364495 A1* | 11/2019 | Mildh | H04W 74/0875 |

(Continued)

FOREIGN PATENT DOCUMENTS

JP     2018-56867 A     4/2018

OTHER PUBLICATIONS

International Search Report issued in Application No. PCT/JP2018/029822, dated Oct. 30, 2018 (3 pages).

(Continued)

*Primary Examiner* — Donald L Mills
(74) *Attorney, Agent, or Firm* — Osha Bergman Watanabe & Burton LLP (57) ABSTRACT

An object is to provide a communication connection device and a communication connection method enabling priority forwarding processes in units of slice networks in addition to in units of communication flows.
The RAN 100 is a communication connection device allocated to one or a plurality of slice networks each of which is a virtual network. The RAN 100 includes the storage unit 102 storing priority of performing a forwarding process for each communication flow representing a data forwarding unit and slice network, and the forwarding processing unit 104 forwarding data transmitted from the core network to the user terminal 50 according to the priority stored in the storage unit 102.

5 Claims, 7 Drawing Sheets

(56) References Cited

U.S. PATENT DOCUMENTS

2020/0120580 A1\* 4/2020 Jin .................. H04W 74/00
2021/0084523 A1\* 3/2021 Kucera .............. H04L 41/0806

OTHER PUBLICATIONS

Written Opinion issued in International Application No. PCT/JP2018/029822, dated Oct. 30, 2018 (3 pages).
3GPP TS 23.501 V15.2.0, Release 15; "3rd Generation Partnership Project; Technical Specification Group Services and System Aspects; System Architecture for the 5G System; Stage 2;" Jun. 2018; Sophia Antipolis Valbonne, France (216 pages).
International Preliminary Report on Patentability for corresponding International Application No. PCT/JP2018/029822, dated Feb. 18, 2021 (6 pages).

\* cited by examiner

| 5QI | FLOW ID |
|---|---|
| 1 | A |
| 2 | B |
| 5 | C |
| ... | |
| 9 | ... |

(b)

| 5QI | S-NSSAI |
|---|---|
| 1 | X |
| 2 | Y |
| ... | ... |

(c)

| FLOW ID | S-NSSAI |
|---|---|
| A | X |
| B | Y |
| | |

| 5QI | FLOW ID |
|---|---|
| 1 | B |
| 2 | A |
| 3 | C |

(b)

| 5QI | S-NSSAI |
|---|---|
| 1 | X |
| 2 | Y |

(c)

| FLOW ID | S-NSSAI |
|---|---|
| A | X |
| C | X |
| B | Y |

Fig.7

COMMUNICATION CONNECTION DEVICE AND COMMUNICATION CONNECTION METHOD

TECHNICAL FIELD

The present invention relates to a communication connection device and a communication connection method for performing a communication priority process.

BACKGROUND ART

In 5GS (5 Generation Network System), in an access network such as a RAN (Radio Access Network), priority is allocated in units of communication flows based on QoS profiles, and a forwarding process according to the priority is performed.

CITATION LIST

Non Patent Literature

Non Patent Literature 1: 3GPP TS 23.501

SUMMARY OF INVENTION

Technical Problem

However, in 5GC (5G Core Network), control such as resource separation is performed in units of slices. Therefore, there is a problem that it is not possible to continuously perform, on a RAN side, processes based on priority in units of slices, such as guaranteeing a resource amount, performed on a core network side.

Therefore, in order to solve the problem described above, an object of the present invention is to provide a communication control device and a communication control method enabling priority forwarding processes in units of slice networks in addition to in units of communication flows.

Solution to Problem

A communication connection device according to the present invention allocated to one or a plurality of slice networks each of which is a virtual network, the communication connection device including: a storage unit configured to store priority of performing a forwarding process, for each communication flow representing a data forwarding unit and the one or the plurality of slice networks; and a forwarding unit configured to transmit data transmitted from the core network to a user terminal, according to the priority stored in the storage unit.

With this configuration, a forwarding process taking into consideration the priority for each slice network in addition to the priority in units of flows can be performed.

Advantageous Effects of Invention

According to the present invention, it is possible to perform a forwarding process for a user terminal according to the priority defined for each communication flow and slice network.

DESCRIPTION OF EMBODIMENTS

An embodiment of the present invention will be described with reference to the accompanying drawings. Wherever possible, identical parts are denoted by identical reference signs, and overlapping descriptions are omitted.

Figure 1:
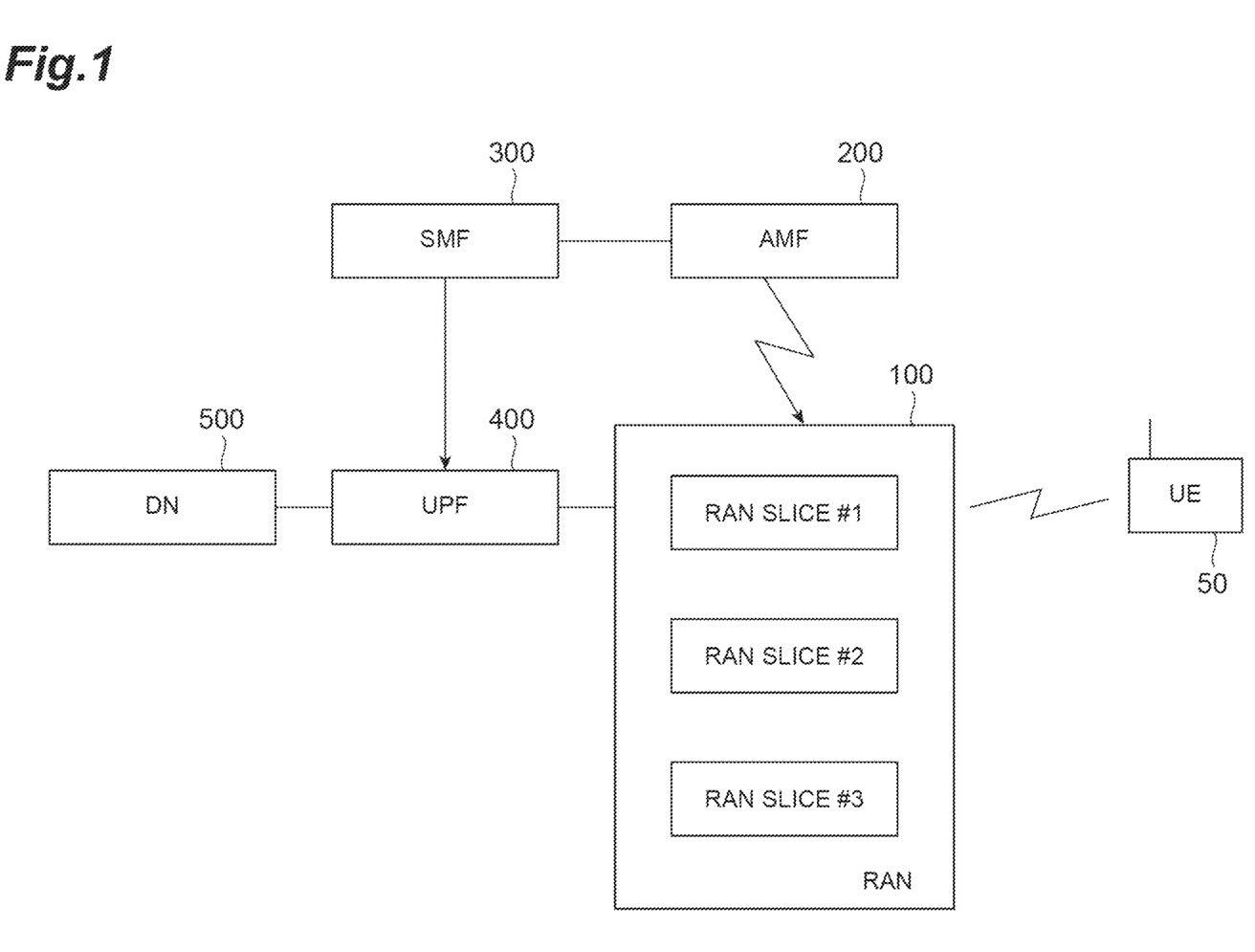
FIG. 1 is a diagram illustrating a system configuration of a communication system according to the present embodiment.

FIG. 1 is a diagram illustrating a system configuration of a communication system according to the present embodiment. As illustrated in the figure, the communication system is configured to include a RAN (Radio Access Network) 100, an AMF (Access and Mobility Management Function) 200, a SMF 300 (Session Management Function), a UPF 400 (User Plane Function), and a DN (Data Network) 500.

The RAN 100 is a base station device configuring an access network for communicating with user terminal (UE: User Equipment) 50 by radio communication. A slice network which is a virtual network constructed on a network infrastructure is allocated to this RAN 100. That is, by allocating resources (memory use amount, CPU allocation amount, bandwidth to be used, and the like) of the RAN 100 to respective slice networks, it is possible to virtually configure several networks. In the present embodiment, slice networks of RAN slices #1 to #3 are allocated to the RAN 100.

The AMF 200 is a NF (Network Function) having a function of performing position management of a mobile communication terminal and a setting process of a communication route. The SMF 300 is a NF having a function of managing sessions. The UPF 400 is a NF for transmitting and receiving user data to and from the RAN 100. The DN 500 is a site located on the Internet or the like.

In the present embodiment, in a node placed in a core network such as the UPF 400, resources are allocated to some core slices (slice networks in the core network). User data is transmitted to the user terminal 50 via the slice network and the RAN slice. In addition, the user data is transmitted and received within the slice network in units of communication flows indicating units of a series of communication procedures.

Figure 2:
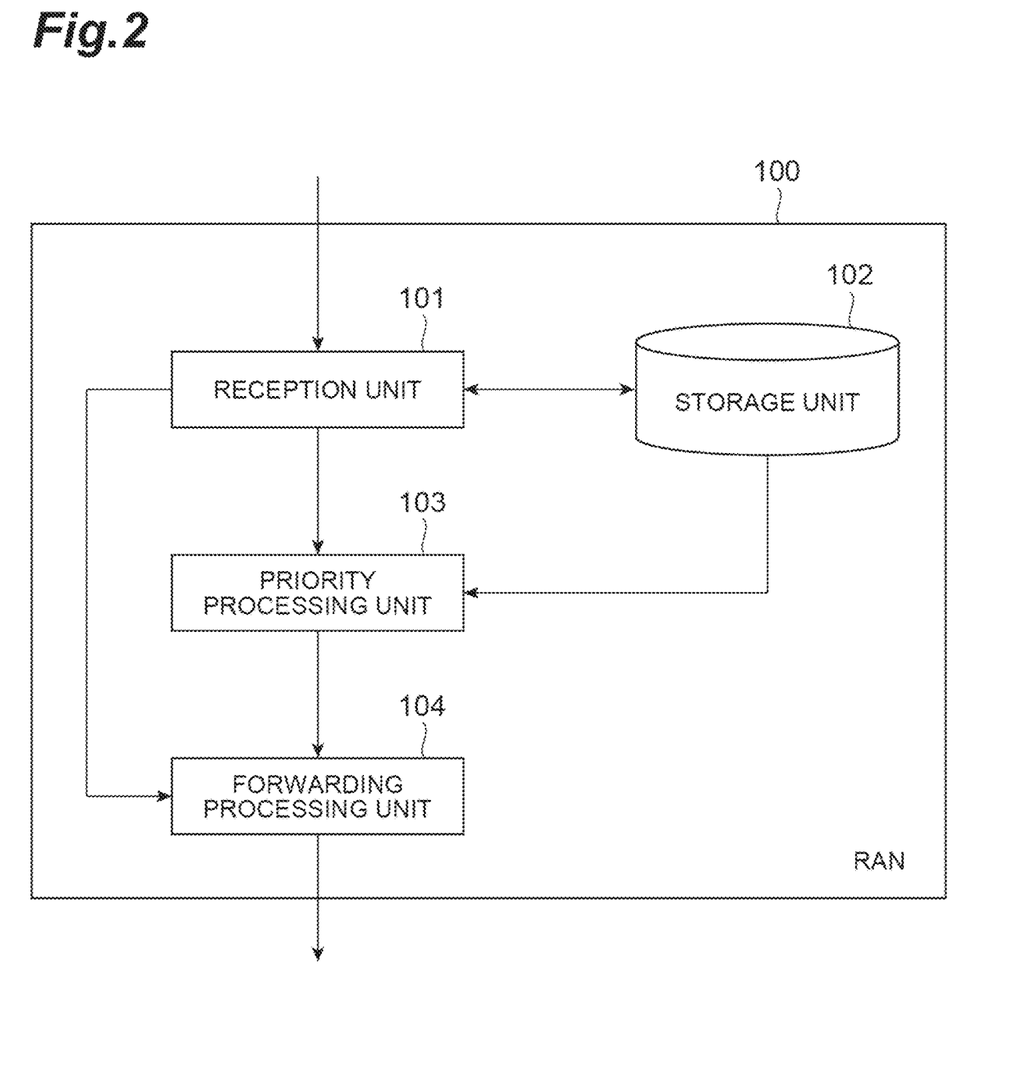
FIG. 2 is a block diagram illustrating a functional configuration of a RAN 100.

Next, the functional configuration of the RAN 100 will be described. FIG. 2 is a block diagram illustrating the functional configuration of the RAN 100. As illustrated in the figure, the RAN 100 is configured to include a receiving unit 101, a storage unit 102, a priority processing unit 103, and a forwarding processing unit 104 (forwarding unit).

The receiving unit 101 is a unit that receives linking information of a Qos profile and a slice from the AMF 200. In addition, the receiving unit 101 is a unit that receives user data from the UPF 400.

Figure 3:
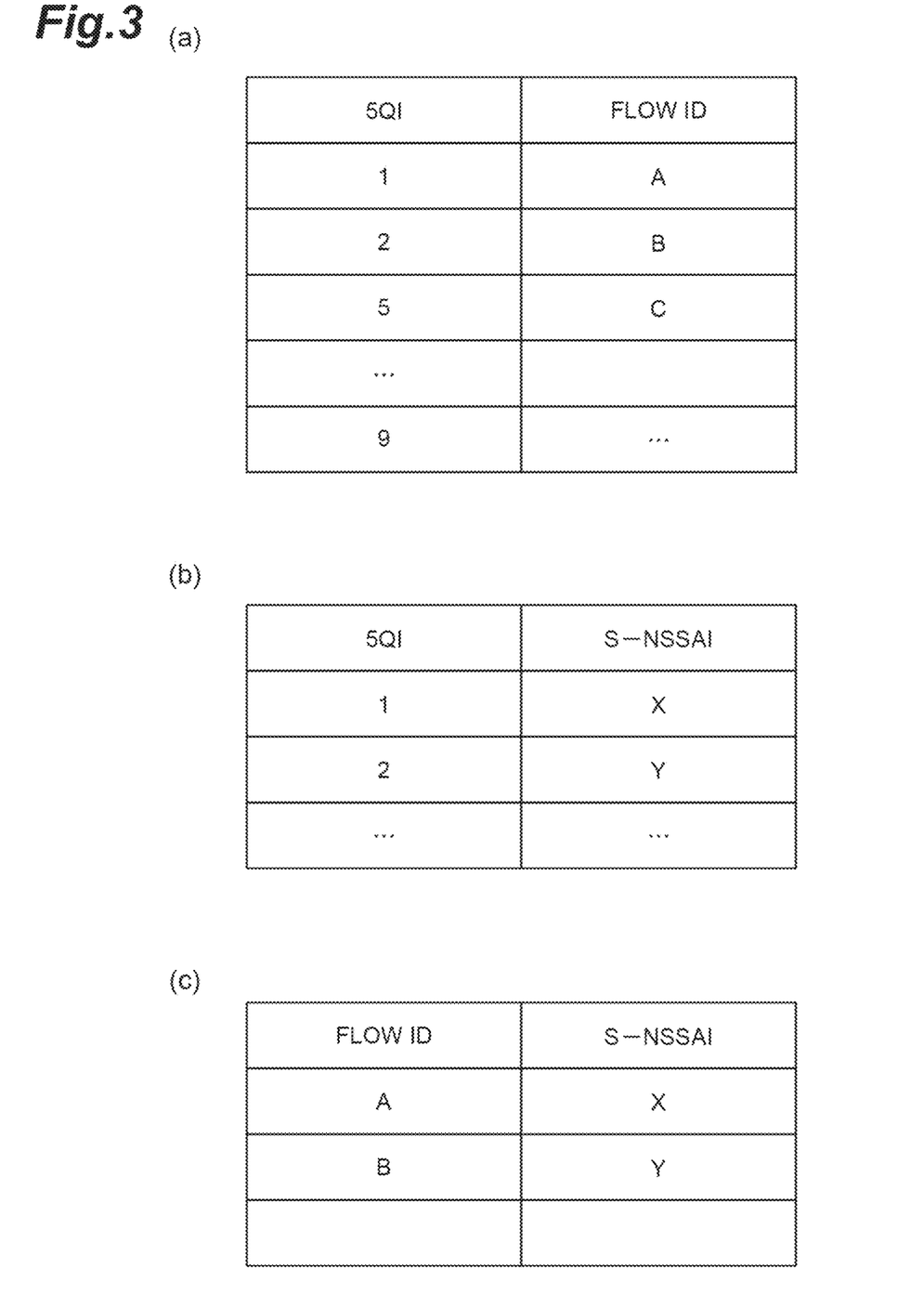
FIG. 3 is a diagram illustrating a specific example of a priority table.

The storage unit 102 is a unit that stores a priority table describing priority of a communication flow and a slice network. FIG. 3 is a diagram illustrating specific examples of the priority table. FIG. 3(a) illustrates a correspondence table between a flow ID and 5QI. FIG. 3(b) illustrates a correspondence table between S-NSSAI (Single-NSSAI) and 5QI. FIG. 3(c) illustrates a correspondence table between a flow ID and S-NSSAI.

5QI (5generation Qos Indicator) is information indicating priority order. In FIG. 3(a), 5QI indicates priority order of flow IDs. Note that 5QI is information included in a Qos profile, and a Qos profile and a flow ID are associated with each other. However, in the figure, entirety of the Qos profile is not illustrated. The same applies to FIG. 3(b).

Similarly, in FIG. 3(b), 5QI is information indicating priority order of S-NSSAI.

In contrast, FIG. 3(c) illustrates association between a flow ID and S-NSSAI. With this management table, several communication flows are associated with a slice indicated by S-NSSAI, and communication control according to the priority order indicated in FIGS. 3(a) and 3(b) is enabled.

The priority processing unit 103 refers to the storage unit 102 and performs a priority process using the flow ID and the S-NSSAI. That is, the priority processing unit 103 derives priority based on the flow ID and the slice ID of the communication flow received by the receiving unit 101, and performs a scheduling process based on the priority. The scheduling process is performed by selecting a resource block having a good communication status from among resource blocks in radio communication.

The forwarding processing unit 104 performs a forwarding process using the resource blocks subjected to the scheduling process performed by the priority processing unit 103.

Figure 4:
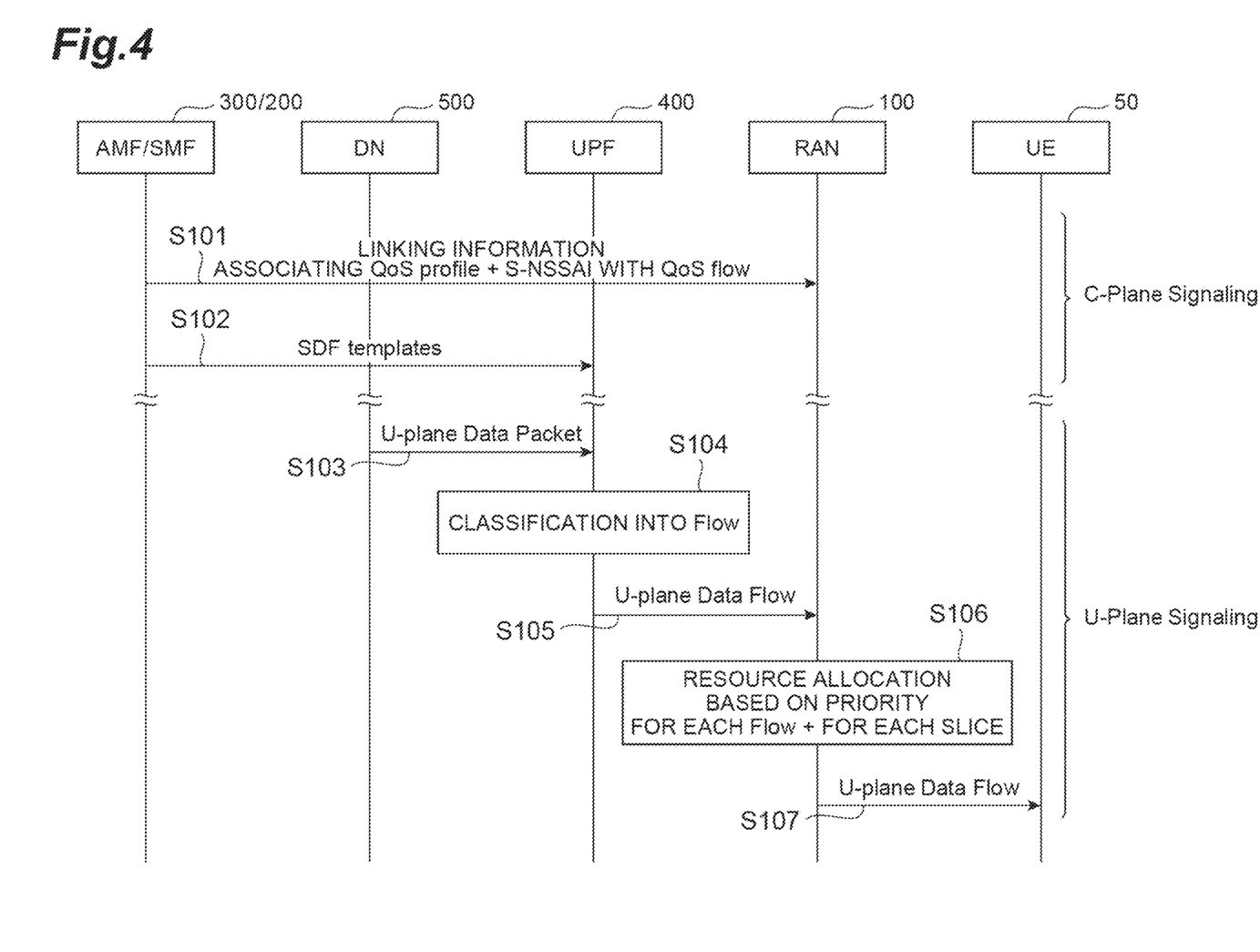
FIG. 4 is a diagram illustrating a processing sequence of a communication system.

Next, a processing sequence of the communication system of the present embodiment will be described. FIG. 4 is a diagram illustrating a processing sequence of the communication system. The AMF 200 transmits to the RAN 100 linking information in which S-NSSAI and a flow ID are associated with a Qos profile (S101). The Qos profile is configured of 5QI, ARP (Allocation and Retention Priority), RQA (Reflective Qos Attribute), GFBR (Guaranteed Flow Bit Rate), MFBR (Maximum Flow Bit Rate), Notification Control, maximum packet loss rate, and the like.

This transmission process is performed by the AMF 200 according to an instruction from an administrator of the slice networks. In addition, the SMF 300 transmits SDF templates to the UPF (S102). The SDF templates are information indicating priority of communication flows. Therefore, the UPF 400 can perform a priority process according to this priority.

Thereafter, the UPF 400 receives user data packets from the DN 500 (S103) and classifies the user data packets for each communication flow (S104). That is, the user data transmitted via slice networks allocated to the UPF 400 is classified for each communication flow. A flow ID for identifying each communication flow is given to a communication flow for each packet, and the communication flows are classified based on the flow IDs.

In the allocated slice networks, the UPF 400 transmits the communication flows classified in units of flows to the RAN 100 (S105).

In the RAN 100, when the receiving unit 101 receives the communication flows, the priority processing unit 103 derives priority by using the flow IDs and the S-NSSAI described in the communication flows as keys. Then, resource allocation is performed based on the priority (S106). The resource allocation based on the priority is performed by the scheduling process.

The forwarding processing unit 104 performs radio communication in the frequency bandwidth and the time band allocated by the scheduling process (S107).

Next, details of the scheduling process based on priority defined for each 5QI and slice ID will be described.

Figure 5:
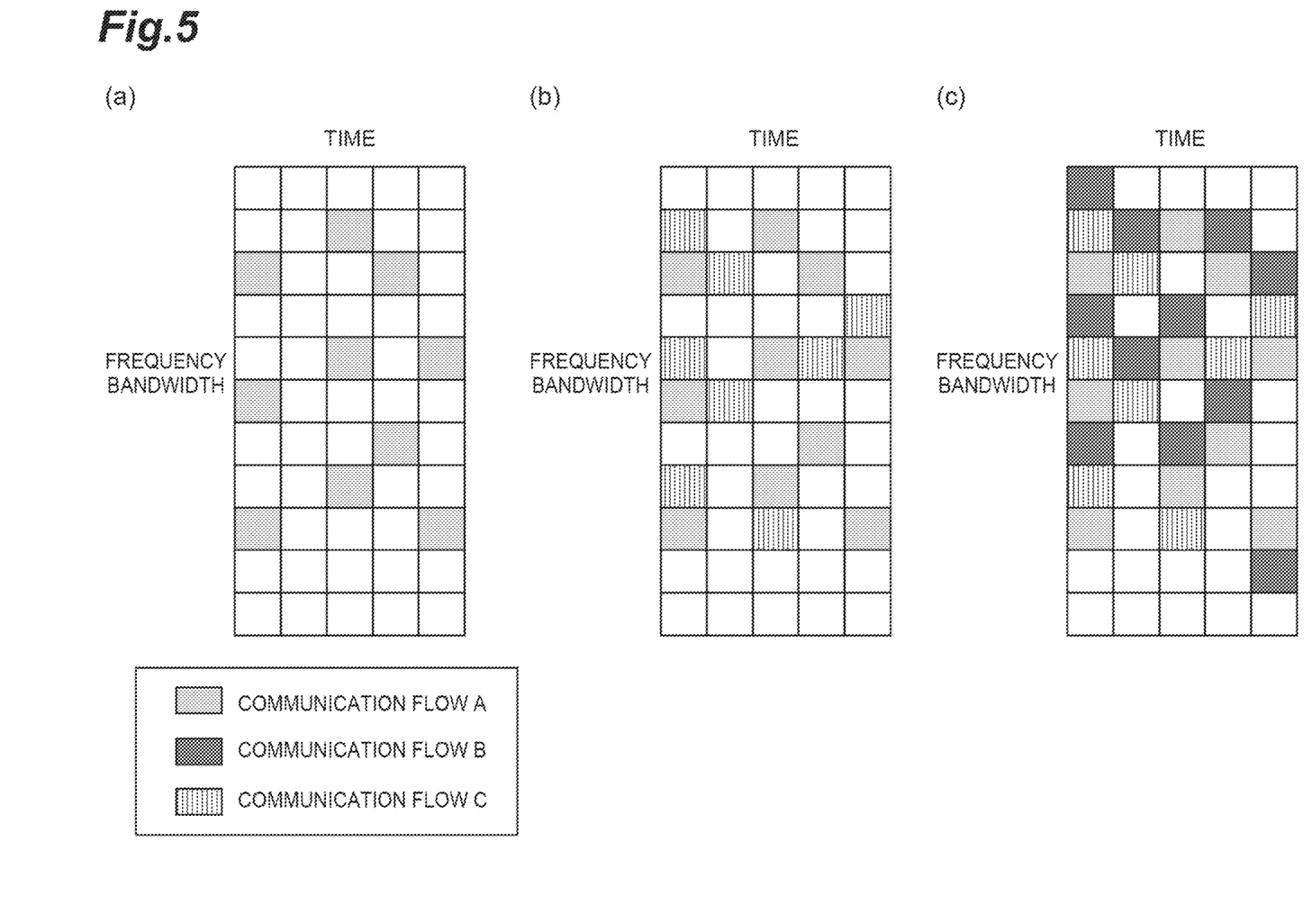
FIG. 5 is a detailed explanatory diagram of a scheduling process.

FIG. 5 is a detailed explanatory diagram of the scheduling process. FIG. 5 illustrates schedules for respective resource blocks. In the figure, the horizontal direction indicates a time zone and the vertical direction indicates the frequency bandwidth used in radio communication. Communication at the designated time and frequency is performed.

S-NSSAI and a flow ID are added to a communication flow transmitted from the UPF 400 (slice network). The priority processing unit 103 derives priority based on S-NSSAI and the flow IDs, and designates a resource block with a better communication status in descending order of priority.

For example, assume that a communication flow A to a communication flow C are transmitted from the UPF 400, the priority processing unit 103 derives priority based on the flow IDs of the communication flows A to C and S-NSSAI of the slice networks through which the communication flows A to C have passed. Priority of each slice and each communication flow is derived by using the priority tables stored in the storage unit 102.

Figure 6:
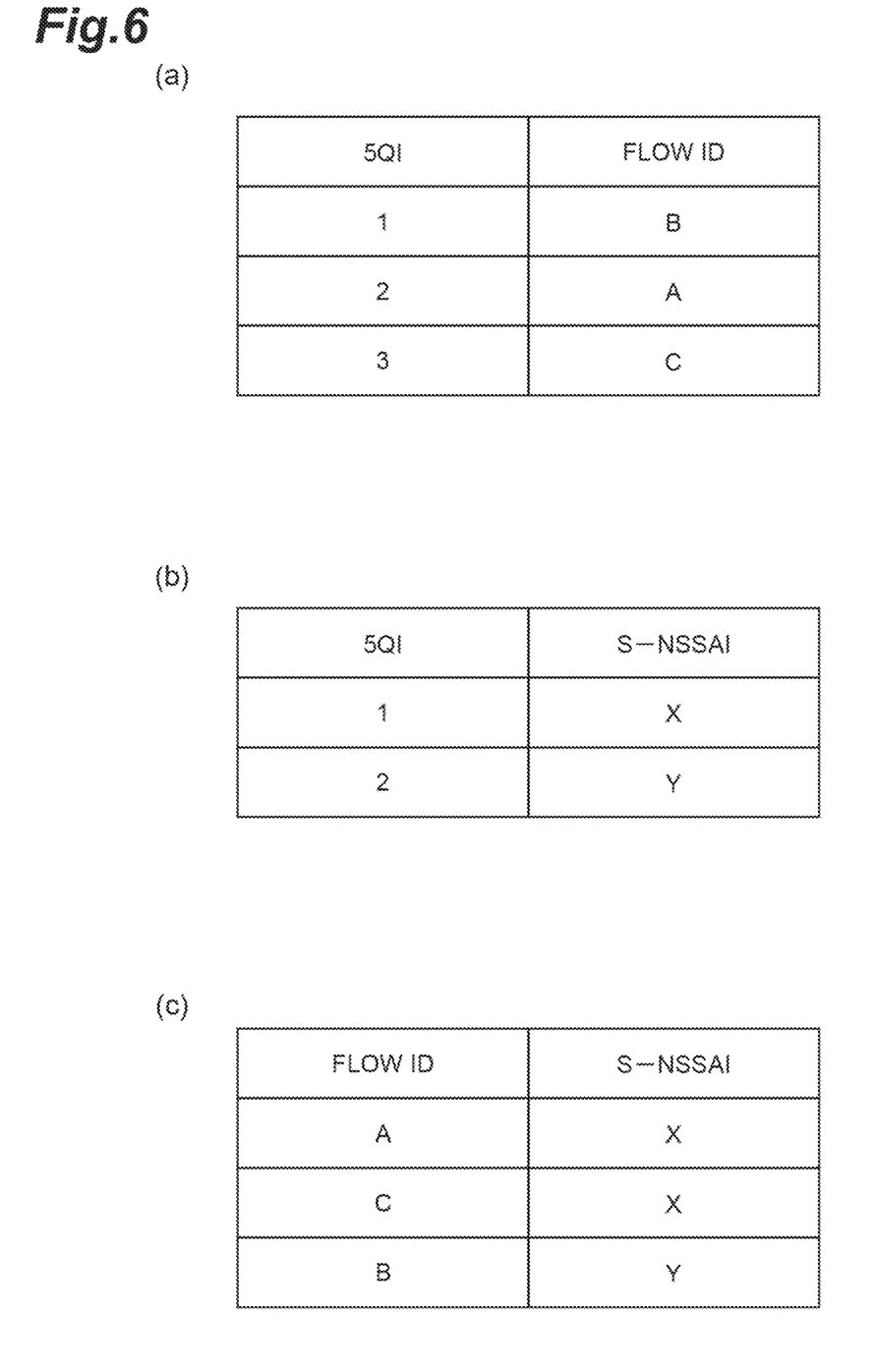
FIG. 6 is a diagram illustrating a specific example of a priority table illustrating one example of the present embodiment.

As illustrated in FIG. 6(c), a communication flow A using a slice network X and a communication flow B using a slice network Y are assumed. Priority is set in order of communication flow B>communication flow A>communication flow C, and priority of the slice network X is set to be higher than that of the slice network Y.

In the present embodiment, even though priority of the communication flow A is lower than that of the communication flow B, priority of the slice network X is high. Therefore, the priority processing unit 103 preferentially schedules resource blocks for the communication flow A (FIG. 5(a)). Thereafter, resource blocks for the communication flow C are scheduled (FIG. 5(b)). Next, since there is no communication flow corresponding to the slice network X, the priority processing unit 103 next schedules resource blocks for the communication flow B of the slice network Y with the second highest priority (FIG. 5(c)). The scheduling process is performed by selecting a predetermined number of resource blocks with good communication status (SN ratio, radio wave condition, and the like) of each resource block.

In this manner, by setting priority of the slices higher than priority of the communication flows, priority control in units of slices on a RAN side (radio section side) is made possible.

Next, operation and effect of the RAN 100 of the present embodiment will be described. The RAN 100 is a communication connection device allocated to one or a plurality of slice networks each of which is a virtual network. The RAN 100 includes the storage unit 102 storing priority of performing a forwarding process for each communication flow representing a data forwarding unit and slice network, and the forwarding processing unit 104 forwarding data transmitted from the core network to the user terminal 50 according to the priority stored in the storage unit 102.

With this configuration, in addition to the priority forwarding process in units of RAN 100 communication flows, a priority forwarding process in units of slice networks can be performed. Therefore, it is possible to make the priority different from priority of another slice network such that a resource amount is guaranteed in units of slice networks.

In addition, in the RAN 100, the storage unit 102 associates one or a plurality of communication flows with each slice network, and stores priority of each of the communication flows and the slice networks. Then, the forwarding processing unit 104 refers to the storage unit 102, and performs a communication flow forwarding process on the communication flow associated with the slice network with higher priority, according to the priority of the communication flows.

With this configuration, it is possible to set priority of the slice networks higher than priority of the communication flows, and it is possible to make the priority different from priority of another slice network such that a resource amount is guaranteed in units of slice networks.

In the RAN 100, the forwarding processing unit 104 performs data forwarding to the user terminal 50 by using radio communication, and performs a scheduling process in a radio section based on the priority.

Due to this configuration, a priority forwarding process of a RAN slice in the radio section can be performed. That is, conventionally, in a radio section, scheduling based on priority in units of flows is performed; however, in addition, it is possible to perform a scheduling process in consideration of priority defined in units of RAN slices.

The block diagrams used in the description of the above embodiment illustrate blocks in units of functions. These functional blocks (components) are realized by any combination of hardware and/or software. In addition, the means for realizing each functional block is not particularly limited. That is, each functional block may be realized by using one physically and/or logically coupled device, or may be realized by directly or indirectly (for example, using a cable and/or radio) connecting two or more devices physically and/or logically separated and by using the plurality of devices.

Figure 7:
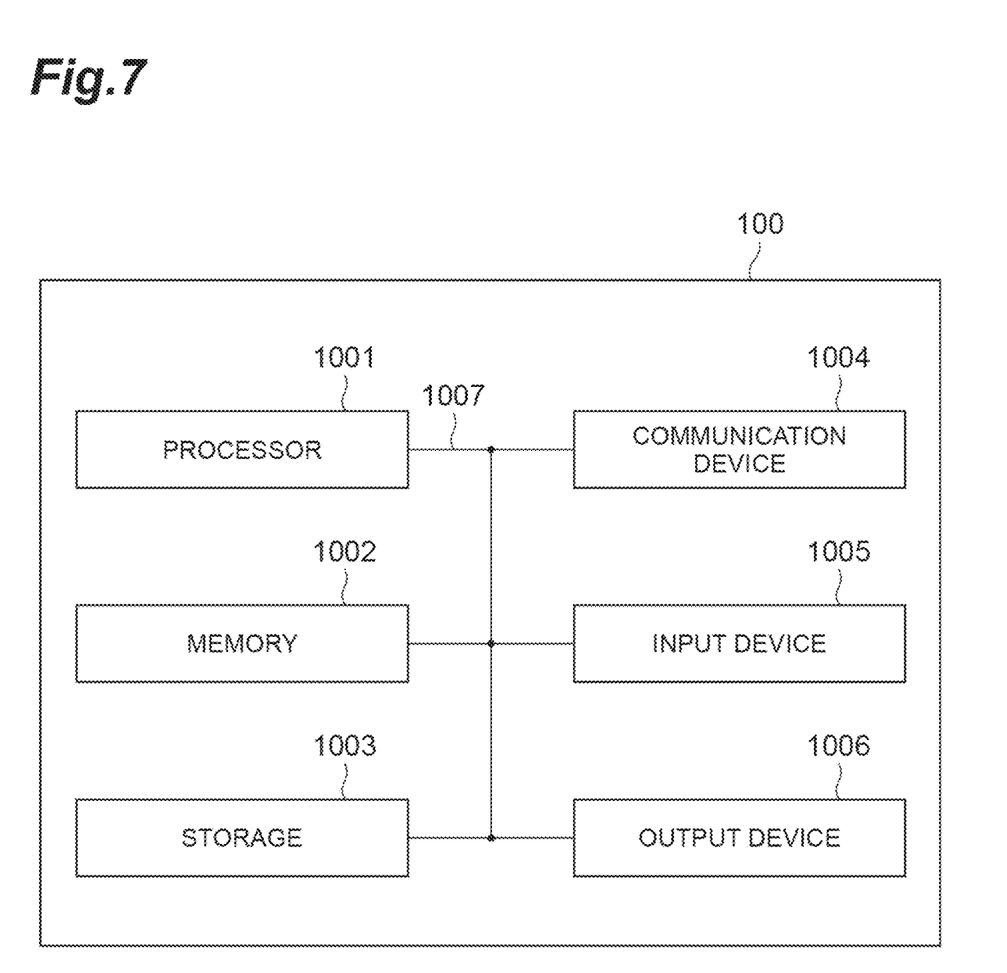
FIG. 7 is a diagram illustrating an example of a hardware configuration of the RAN 100 according to the present embodiment.

For example, the RAN 100 according to an embodiment of the present invention may function as a computer that performs processes of the present embodiment. FIG. 7 is a diagram illustrating an example of a hardware configuration of the RAN 100 according to the present embodiment. The RAN 100 described above may be physically configured as a computer device including a processor 1001, a memory 1002, a storage 1003, a communication device 1004, an input device 1005, an output device 1006, a bus 1007, and the like.

Note that in the following description, the expression "device" can be replaced with a circuit, device, unit, or the like. The hardware configuration of the RAN 100 may be configured to include one or a plurality of the respective devices illustrated in the figure, or may be configured without including some of the devices.

Each function of the RAN 100 is realized by causing predetermined software (program) to be loaded into hardware such as the processor 1001 and the memory 1002 so that the processor 1001 performs computation and controls communication performed by the communication device 1004 and reading and/or writing of data from and to the memory 1002 and the storage 1003.

The processor 1001 operates, for example, an operating system to control the entire computer. The processor 1001 may be configured of a central processing unit (CPU) including an interface with a peripheral device, a control device, a computing device, a register, and the like. For example, the priority processing unit 103 or the like may be realized by the processor 1001.

In addition, the processor 1001 causes a program (program code), a software module, and data to be loaded from the storage 1003 and/or the communication device 1004 into the memory 1002, and executes various processes according to them. As the program, a program causing the computer to execute at least some of the operations described in the embodiment described above is used. For example, the RAN 100 may be realized by a control program that is stored in the memory 1002 and operates in the processor 1001. Other functional blocks may be similarly realized. Even though it has been described that various processes described above are executed by one processor 1001; however, the various processes may be executed simultaneously or sequentially by two or more processors 1001. The processor 1001 may be implemented as one or more chips. Note that the program may be transmitted from a network through a telecommunications line.

The memory 1002 is a computer-readable recording medium and may be configured of at least one of a ROM (Read Only Memory), an EPROM (Erasable Programmable ROM), an EEPROM (Electrically Erasable Programmable ROM), a RAM (Random Access Memory), and the like, for example. The memory 1002 may be referred to as a register, a cache, a main memory (main storage device), or the like. The memory 1002 can store a program (program code), a software module, and the like which can be executed for performing the radio communication method according to an embodiment of the present invention.

The storage 1003 is a computer-readable recording medium and may be configured of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and the like, for example. The storage 1003 may be referred to as an auxiliary storage device. The storage medium described above may be an appropriate medium such as a database, a server, or the like including the memory 1002 and/or the storage 1003. The storage unit 102 described above may be realized by the storage 1003.

The communication device 1004 is hardware (transmission and reception device) for performing communication between computers through a wired network and/or a wireless network, and is also referred to as a network device, a network controller, a network card, a communication module, or the like, for example. For example, the receiving unit 101, the forwarding processing unit 104, and the like described above may be realized by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, a LED lamp, or the like) that performs output to the outside. Note that a configuration may be possible in which the input device 1005 and the output device 1006 are integrated (for example, a touch panel).

In addition, the respective devices such as the processor 1001 and the memory 1002 are connected by the bus 1007 for communicating information. The bus 1007 may be configured of a single bus or may be configured by using different buses between respective devices.

In addition, the RAN 100 may be configured to include hardware such as a microprocessor, a digital signal processor (DSP), an ASIC (Application Specific Integrated Circuit), a PLD (Programmable Logic Device), a FPGA (Field Programmable Gate Array), or the like, and some or all of the functional blocks may be realized by the hardware. For example, the processor 1001 may be implemented by using at least one of the above examples of the hardware.

Although the present embodiment is described in detail in the foregoing, it is apparent to those skilled in the art that the present embodiment is not limited to the embodiment described in the present Description. The present embodiment can be implemented as a modified and changed aspect without deviating from the spirit and scope of the present invention defined by the Claims. Accordingly, what is described in the present Description is given by way of illustration and does not have any restrictive meaning to the present embodiment.

Information notification is not limited to the aspect/embodiment described in the present Description, and may be performed by another method. For example, information notification may be performed by physical layer signaling (for example, DCI (Downlink Control Information), UCI (Uplink Control Information)), upper layer signaling (for example, RRC (Radio Resource Control) signaling, MAC (Medium Access Control) signaling), notification information (MIB (Master Information Block), SIB (System Information Block))), other signals, or a combination thereof. In addition, the RRC signaling may be referred to as a RRC message, and may be, for example, a RRC Connection Setup message, a RRC Connection Reconfiguration message, or the like.

Each aspect/embodiment described in the present Description can be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), a system using another appropriate system, and/or a next-generation system extended according to them.

As long as there is no inconsistency, the order in which the processing procedure, the sequence, the flowcharts, or the like is performed in each aspect/embodiment described in the present Description may be changed. For example, regarding the method described in the present Description, elements of various steps are presented in an exemplary order and is not limited to the specific order presented.

Information or the like can be output from an upper layer (or a lower layer) to the lower layer (or the upper layer). Information or the like may be input and output via a plurality of network nodes.

Information or the like that has been input or output may be stored in a specific place (for example, the memory), or may be managed by using a management table. Information or the like to be input or output can be overwritten, updated, or added. Information or the like that has been output may be deleted. Information or the like that has been input may be transmitted to another device.

Judging may be performed by using a value (0 or 1) represented by 1 bit, may be performed by using a Boolean value (true or false), or may be performed by using numerical comparison (for example, comparison with a predetermined value).

Each aspect/embodiment described in the present Description may be used alone or in combination, or may be used by being switched over in accordance with execution. In addition, notification of predetermined information (for example, notification of "being X") is not limited to being made explicitly, and may be made implicitly (for example, notification of the predetermined information is not made).

Software should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether software may be referred to as software, firmware, middleware, microcode, hardware description language or referred to as another name.

In addition, software, an instruction, and the like may be transmitted and received via a transmission medium. For example, in a case where software is transmitted from a website, a server, or another remote source by using a wired technology such as a coaxial cable, a fiber optic cable, a twisted-pair wire, and a digital subscriber line (DSL), and/or wireless technology such as infrared rays, radio, microwaves, or the like, the wired technology and/or the wireless technology are included within the definition of the transmission medium.

Information, signals, and the like described in the present Description may be represented by using any of a variety of different techniques. For example, data, an instruction, a command, information, a signal, a bit, a symbol, a chip, and the like that can be mentioned throughout the above description may be represented by a voltage, a current, an electromagnetic wave, a magnetic field or a magnetic particle, or a photo field or a photon, or any combination thereof.

Note that the terms described in the present Description and/or terms necessary for understanding the present Description may be replaced with terms having identical or similar meanings.

The terms "system" and "network" used in the present Description are used interchangeably.

In addition, information, parameters, and the like described in the present Description may be expressed by an absolute value, may be expressed by a relative value from a predetermined value, or may be expressed by other corresponding information. For example, radio resources may be indicated by an index.

The names used for the parameters described above are not restrictive names in any respect. Further, mathematical expressions and the like using these parameters may be different from those explicitly disclosed in the present Description. Since various channels (for example, PUCCH, PDCCH, and the like) and information elements (for example, TPC) can be identified by any suitable names, various names assigned to these various channels and information elements are not restrictive in any way.

The user terminal may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

The terms "determining" and "determining" used in the present Description may encompass a wide variety of motions. For example, "determining" or "determining" can include considering judging, calculating, computing, processing, deriving, investigating, looking up (for example, looking up in a table, a database, or another data structure), ascertaining, or the like, to be determined or determined. In addition, "determining" or "determining" can include considering receiving (for example, receiving information), transmitting (for example, transmitting information), input, output, or accessing (for example, accessing data in the memory), to be determined or determined. In addition, "determining" or "determining" can include considering resolving, selecting, choosing, establishing, comparing, or the like, to be determined or determined. That is, "determining" or "determining" can include considering a certain operation to be "determined" or "determined".

The terms "connected" and "coupled" or every transformation of these terms mean every direct or indirect connection or coupling between two or more elements, and may include a case where there are one or more intermediate elements between two elements that are "connected" or "coupled" to each other. Coupling or connection between elements may be a physical coupling or connection, logical coupling or connection, or a combination thereof. In a case of being used in the present Description, it can be considered that two elements are "connected" or "coupled" to each other by using one or more electric wires, cables, and/or printed electric connections, and as several non-definitive and non-comprehensive examples, by using electromagnetic energy such as electromagnetic energy having a wavelength of a radio frequency region, a microwave region, and an optical (both visible and invisible) region.

The phrase "based on" used in the present Description does not mean "based only on" unless otherwise stated. In other words, the phrase "based on" means both "based only on" and "based at least on".

"Means" in the configuration of each of the above devices may be replaced with "unit", "circuit", "device", or the like.

In a case where "include", "including", and transformation of them are used in the present Description or the Claims, those terms are intended to be comprehensive like the term "comprising" as long as they are used in the present Description or the Claims. In addition, the term "or" used in the present Description or the Claims is not intended to be exclusive OR as long as it is used in the present Description or the Claims.

In the present Description, it is intended to include a plurality of devices unless the device is obviously only one in the context or technically.

REFERENCE SIGNS LIST

101 Receiving unit
102 Storage unit
103 Priority processing unit
104 Forwarding processing unit

The invention claimed is:

1. A communication connection device allocated to one or a plurality of slice networks each of which is a virtual network, the communication connection device comprising:
a storage unit configured to store a priority table, the priority table storing a priority of communication flows using flow identifiers and a priority of the one or plurality of slice networks, each of the communication flows representing a data forwarding unit; and
a forwarding unit configured to forward data transmitted from a core network to a user terminal, according to a priority of performing a forwarding process of data in units of communication flows or units of slice networks,
wherein the storage unit associates each of the communication flows with each of the one or plurality of slice networks, and stores both the priority of communication flows and the priority of the one or plurality of slice networks in the priority table, and
wherein the forwarding unit refers to the storage unit and performs a forwarding process of a communication flow in order of the priority of the one or plurality of slice networks as indicated in the priority table and subsequently in order of the priority of communication flows associated with each of the one or plurality of slice networks as indicated in the priority table.

2. The communication connection device according to claim 1, wherein the forwarding unit performs data forwarding to the user terminal by using radio communication, and performs a communication flow forwarding process by performing a scheduling process in a radio section, based on the priority.

3. The communication connection device according to claim 1, further comprising:
a priority processing unit configured to derive the priority of performing the forwarding process of data based on the stored priority of communication flows and the stored priority of the one or plurality of slice network; and
a receiving unit configured to receive the communication flows.

4. A communication connection method of a communication connection device allocated to one or a plurality of slice networks each of which is a virtual network, the method comprising:
storing a priority of communication flows using flow identifiers and a priority of one or plurality of slice networks in a priority table stored in a storage unit, each of a communication flow representing a data forwarding unit; and
forwarding data transmitted from a core network to a user terminal according to a priority of performing a forwarding process in units of communication flows or units of slice networks,
wherein the storage unit associates each of the communication flows with each of the one or plurality of slice networks, and stores both the priority of communication flows and the priority of the one or plurality of slice networks in the priority table, and
wherein the data forwarding unit refers to the storage unit and performs a forwarding process of a communication flow in order of the priority of the one or plurality of slice networks as indicated in the priority table and subsequently in order of the priority of communication flows associated with each of the one or plurality of slice networks as indicated in the priority table.

5. The communication connection method according to claim 4, further comprising:
before the storing, receiving communication flows; and
between the storing and the forwarding, deriving the priority of performing the forwarding process of data based on the stored priority of the communication flows and the stored priority of the one or plurality of slice network.

* * * * *